United States Patent
McFadyen et al.

(10) Patent No.: US 7,380,075 B2
(45) Date of Patent: May 27, 2008

(54) SYSTEM AND METHOD FOR SUPPORTING VARIABLE-WIDTH MEMORY ACCESSES

(75) Inventors: Doug McFadyen, Delta (CA); Juraj Bystricky, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 277 days.

(21) Appl. No.: 11/284,568

(22) Filed: Nov. 22, 2005

(65) Prior Publication Data

US 2007/0118701 A1    May 24, 2007

(51) Int. Cl.
    *G06F 13/14*    (2006.01)
(52) U.S. Cl. ....................................... 711/154
(58) Field of Classification Search ................ 711/154; 710/307
    See application file for complete search history.

(56) References Cited

U.S. PATENT DOCUMENTS 5,260,555 A    11/1993    Sakamoto
6,038,655 A    3/2000    Little et al.
2003/0067456 A1    4/2003    Low et al.
2004/0098549 A1*    5/2004    Dorst .......................... 711/167

* cited by examiner

*Primary Examiner*—Kevin L Ellis
(74) *Attorney, Agent, or Firm*—Mark P. Watson

(57) ABSTRACT

A system and method for supporting variable-width memory accesses includes storage registers configured to store transfer data. The storage registers have a pre-determined storage register width. A host interface moves the transfer data to and from the storage registers. The host interface has a data transfer width that is greater than the storage register width. A memory access module analyzes a mode flag that is incorporated into a transfer address. The memory access module performs the memory access operation in a full mode if the mode flag is set to a full access state. Conversely, the memory access module performs the memory access operation in a partial access mode if the mode flag is set to a partial access state. In the partial transfer mode, the transfer data has a data width that is equal to the storage register width. The memory storage module is able to directly access a single one of the storage registers.

19 Claims, 11 Drawing Sheets

SYSTEM AND METHOD FOR SUPPORTING VARIABLE-WIDTH MEMORY ACCESSES

BACKGROUND SECTION

1. Field of Invention

This invention relates generally to electronic display controller systems, and relates more particularly to a system and method for supporting variable-width memory accesses.

2. Description of the Background Art

Implementing efficient methods for handling electronic data is a significant consideration for designers and manufacturers of contemporary electronic devices. However, efficiently handling data with electronic devices may create substantial challenges for system designers. For example, enhanced demands for increased device functionality and performance may require more system operating power and require additional hardware resources. An increase in power or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that efficiently manipulates, transfers, and displays digital image data may benefit from an efficient implementation because of the large amount and complexity of the digital data involved.

Due to growing demands on system resources and substantially increasing data magnitudes, it is apparent that developing new techniques for controlling the handling of electronic data is a matter of concern for related electronic technologies. Therefore, for all the foregoing reasons, developing efficient systems for handling electronic data remains a significant consideration for designers, manufacturers, and users of contemporary electronic devices.

SUMMARY

In accordance with the present invention, a system and method are disclosed for supporting variable-width memory accesses in an electronic device. In certain embodiments, the electronic device may be implemented to include a central-processing unit (CPU), a display, and a display controller with a host interface.

In one embodiment of a read memory-access operation, a memory access module of the display controller initially analyzes a mode flag incorporated into a read address stored in an index register of the host interface. The memory access module determines whether to perform the read operation in a full mode or in a partial mode based upon the status of the mode flag. If the mode flag indicates performing a full mode access, then the memory access module performs a full-width read access to obtain transfer data with a data width that is substantially equal to the data transfer width of the host interface.

However, if the mode flag indicates performing a partial mode access, then the memory access module analyzes the read address stored in the index register to determine whether the read address is an even or odd value. If the read address is an even value, then the memory access module loads the contents of the corresponding addressed even register from controller registers of the display controller into the lower bits of a data register in the host interface. The memory access module also loads a zero value into the upper bits of the data register.

Alternately, if the read address stored in the index register is an odd value, then the memory access module loads the contents of the corresponding addressed odd register from the controller registers into the lower bits of the data register. The memory access module also loads a zero value into the upper bits of the data register.

In one embodiment of a write memory-access operation, a memory access module of the display controller initially analyzes a mode flag incorporated into a write address stored in an index register of the host interface. The memory access module determines whether to perform the write operation in a full mode or in a partial mode based upon the status of the mode flag. If the mode flag indicates performing a full mode access, then the memory access module performs a full-width write access to provide transfer data with a data width that is substantially equal to the data transfer width of the host interface.

However, if the mode flag indicates performing a partial mode access, then the memory access module analyzes the write address stored in the index register to determine whether the write address is an even or odd value. If the write address is an even value, then the memory access module loads the contents of the lower bits of the data register in the host interface into a corresponding addressed even storage register from the controller registers. The memory access module ignores the contents of the upper bits of the data register.

Alternately, if the write address stored in the index register is an odd value, then the memory access module loads the contents of the lower bits of the data register into a corresponding addressed odd register from the controller registers. The memory access module ignores the contents of the upper bits of data register. Therefore, in accordance with the present invention, if the mode flag indicates performing a partial mode, then the memory access module may perform a memory access operation to provide transfer data with a data width that is less the data transfer width of the host interface of the display controller. For at least the foregoing reasons, the present invention provides an improved system and method for supporting variable-width memory accesses.

DETAILED DESCRIPTION

The present invention relates to an improvement in display controller systems. The following description is presented to enable one of ordinary skill in the art to make and use the invention, and is provided in the context of a patent application and its requirements. Various modifications to the embodiments disclosed herein will be apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for supporting variable-width memory accesses, and includes storage registers configured to store transfer data. The storage registers have a pre-determined storage register width. A host interface moves the transfer data to and from the storage registers. The host interface has a data transfer width that is greater than the storage register width. A memory access module analyzes a mode flag that is incorporated into a transfer address. The memory access module performs the memory access operation in a full mode if the mode flag is set to a full access state. Conversely, the memory access module performs the memory access operation in a partial access mode if the mode flag is set to a partial access state. In the partial transfer mode, the transfer data has a data width that is equal to the storage register width. The memory storage module is therefore able to directly access a single one of the storage registers in the partial access mode.

Figure 1:
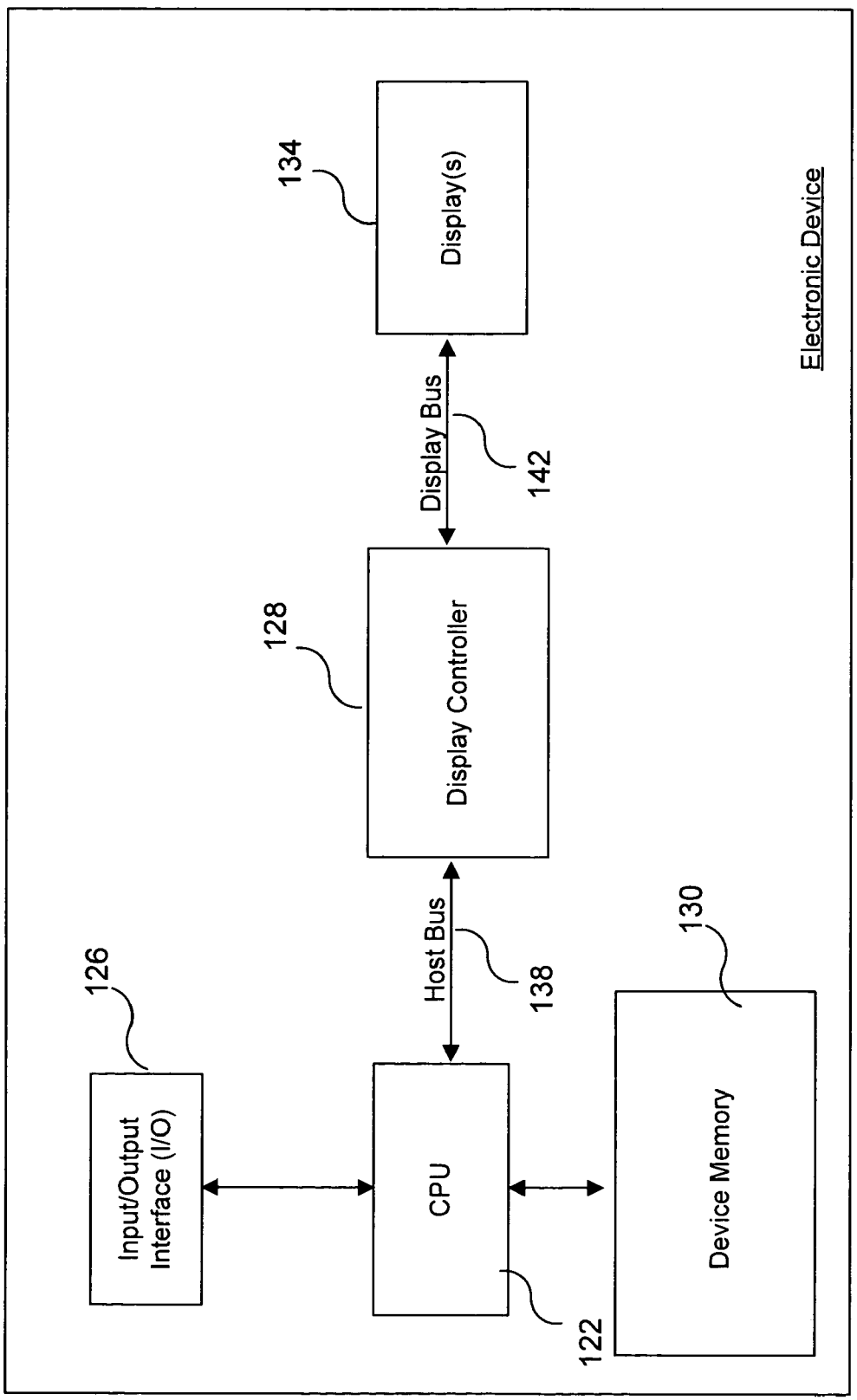
FIG. 1 is a block diagram for one embodiment of an electronic device, in accordance with the present invention.

Referring now to FIG. 1, a block diagram for one embodiment of an electronic device 110 is shown, according to the present invention. The FIG. 1 embodiment includes, but is not limited to, a central processing unit (CPU) 122, an input/output interface (I/O) 126, a display controller 128, a device memory 130, and one or more display(s) 134. In alternate embodiments, electronic device 110 may include elements or functionalities in addition to, or instead of, certain of the elements or functionalities discussed in conjunction with the FIG. 1 embodiment.

In the FIG. 1 embodiment, CPU 122 may be implemented as any appropriate and effective processor device or microprocessor to thereby control and coordinate the operation of electronic device 110 in response to various software program instructions. In the FIG. 1 embodiment, device memory 130 may comprise any desired storage-device configurations, including, but not limited to, random access memory (RAM), read-only memory (ROM), and storage devices such as removable memory or hard disk drives.

In the FIG. 1 embodiment, a device application (not shown) may include program instructions for allowing CPU 122 to provide image data and corresponding transfer and display information via host bus 138 to display controller 128. In certain embodiments, display controller 128 utilizes an indirect host interface to communicate with host bus 138. An indirect host interface typically permits utilizing a reduced number of connection paths through host bus 138 to CPU 122. In certain embodiments, the indirect host interface may be implemented as a sixteen-bit indirect host interface that transfers sixteen digital bits of transfer data. In the FIG. 1 embodiment, display controller 128 contains an array of controller registers. In certain embodiments, the controller registers may be implemented as eight-bit registers that work in conjunction with the sixteen-bit indirect host interface and host bus 138.

In the FIG. 1 embodiments, display controller 128 responsively provides the received image data via display bus 142 to at least one of the display(s) 134 of electronic device 110. In the FIG. 1 embodiment, input/output interface (I/O) 126 may include one or more interfaces to receive and/or transmit any required types of information to or from electronic device 110. Input/output interface 126 may include one or more means for allowing a device user to communicate with electronic device 110. In addition, various external electronic devices may communicate with electronic device 110 through I/O 126. For example, a digital imaging device, such as a digital camera, may utilize input/output interface 126 to provide captured image data to electronic device 110.

In the FIG. 1 embodiment, electronic device 110 may advantageously utilize display controller 128 for efficiently managing various operations and functionalities relating to display(s) 134. The implementation and functionality of display controller 128 is further discussed below in conjunction with FIGS. 2-4 and 6-11. In the FIG. 1 embodiment, electronic device 110 may be implemented as any desired type of electronic device or system. For example, in certain embodiments, electronic device 110 may alternately be implemented as a cellular telephone, a personal digital assistant device, an electronic imaging device, or a computer device. Various embodiments for the operation and utilization of electronic device 110 are further discussed below in conjunction with FIGS. 2-11.

Figure 2:
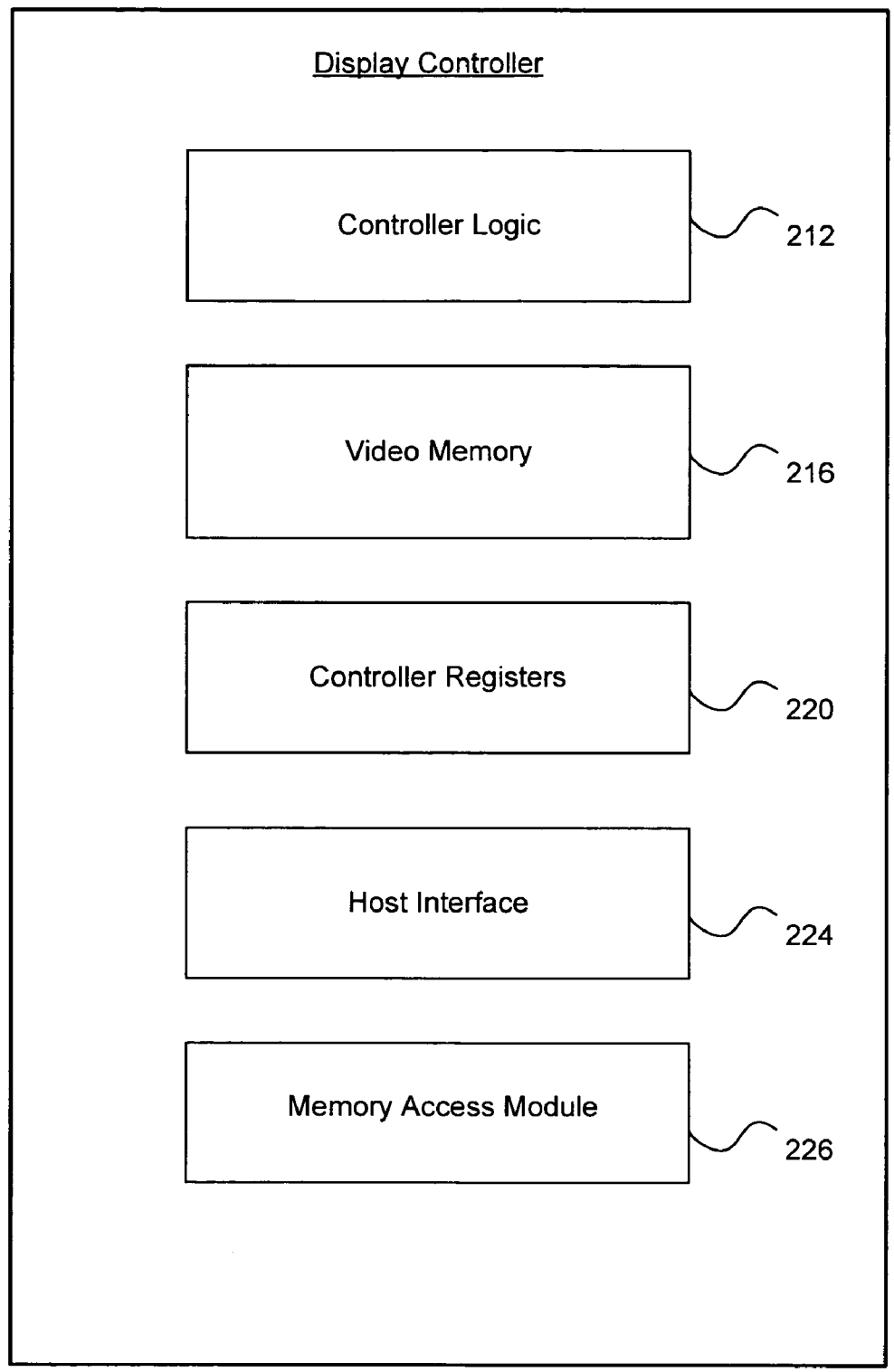
FIG. 2 is a block diagram for one embodiment of the display controller of FIG. 1, in accordance with the present invention.

Referring now to FIG. 2, a block diagram for one embodiment of the FIG. 1 display controller 128 is shown, in accordance with the present invention. The FIG. 2 embodiment includes, but is not limited to, controller logic 212, video memory 216, controller registers 220, a host interface 224, and a memory access module 226. In alternate embodiments, display controller 128 may include elements or functionalities in addition to, or instead of, certain of the elements or functionalities discussed in conjunction with the FIG. 2 embodiment.

In the FIG. 2 embodiment, display controller 128 may be implemented as an integrated circuit device that accepts image data and corresponding transfer and display information from CPU 122 (FIG. 1). Display controller 128 then automatically provides the received image data to display 134 of electronic device 110 in an appropriate and efficient manner for displaying to a device user. In the FIG. 2 embodiment, controller logic 212 manages and coordinates the overall operation of display controller 128. In the FIG. 2 embodiment, display controller 128 may utilize controller registers 220 to store various types of configuration, control and status information, as discussed above in conjunction with FIG. 1. In the FIG. 2 embodiment, display controller 128 utilizes host interface 224 to perform bi-directional communications with CPU 122 via a host bus 138 (FIG. 1). As discussed above in conjunction with FIG. 1, in certain embodiments, in order to implement host interface 224 and host bus 138 in an efficient manner, host interface 224 may be implemented as an indirect host interface.

In accordance with the present invention, display controller 128 may advantageously utilize memory access module 226 to perform certain variable-width memory access operations. The utilization of memory access module 226 is further discussed below in conjunction with FIGS. 6-11.

Figure 3:
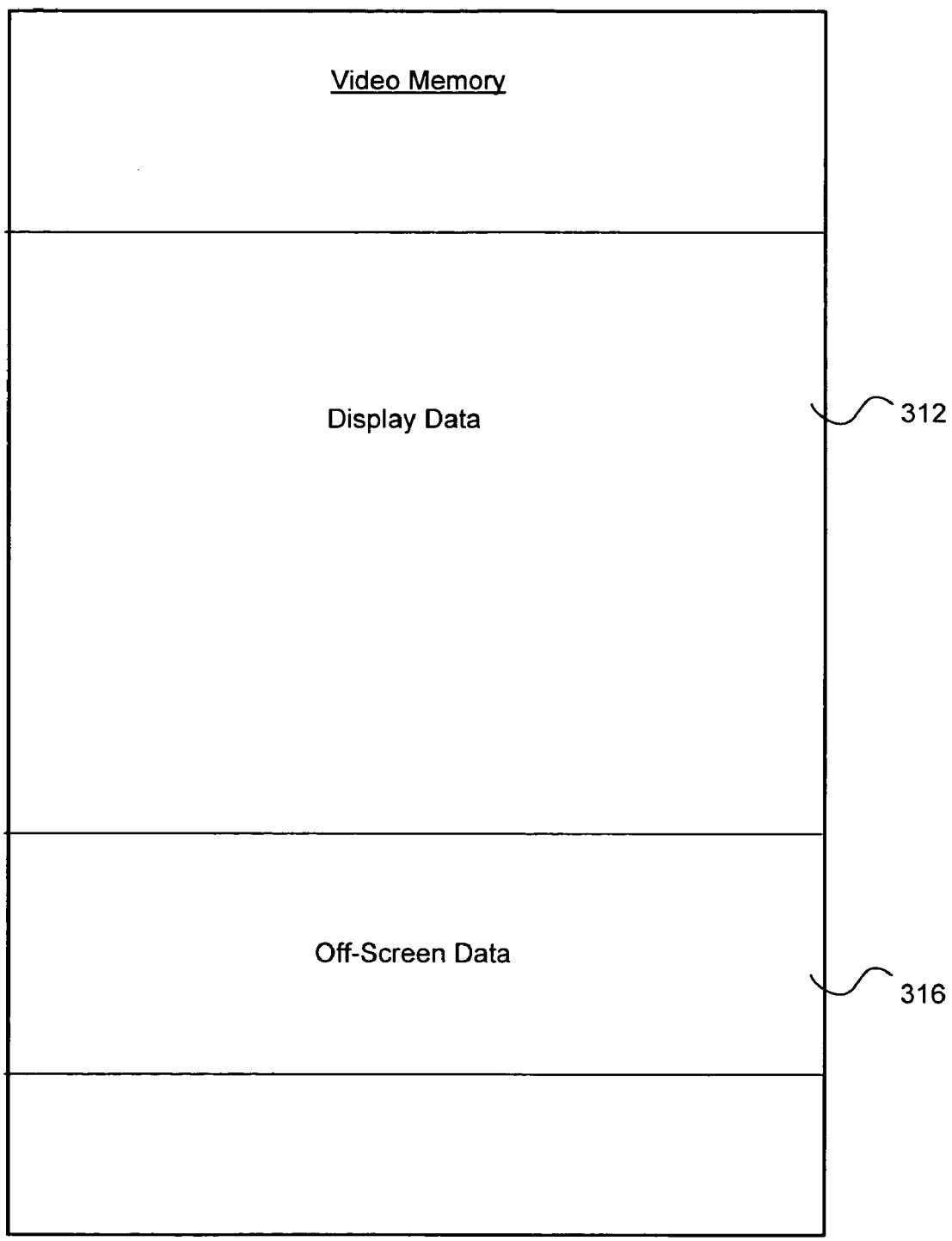
FIG. 3 is a block diagram for one embodiment of the video memory of FIG. 2, in accordance with the present invention.

Referring now to FIG. 3, a block diagram for one embodiment of the FIG. 2 video memory 216 is shown, in accordance with the present invention. In the FIG. 3 embodiment, video memory 216 includes, but is not limited to, display data 312 and off-screen data 316. In alternate embodiments, video memory 216 may include elements and functionalities in addition to, or instead of, certain of the elements and functionalities discussed in conjunction with the FIG. 3 embodiment.

In the FIG. 3 embodiment, video memory 216 may be implemented by utilizing any effective types of memory devices or configurations. For example, in certain embodiments, video memory 216 may be implemented as a random-access memory (RAM) device. In the FIG. 3 embodiment, display data 312 may include image data that is provided by CPU 122 or other appropriate source. In the FIG. 3 embodiment, off-screen data 316 may include any appropriate type of information or data that is not intended for presentation upon display 134 of electronic device 110. For example, off-screen data 316 may be utilized to cache certain fonts or other objects for use by display controller 128.

Figure 4:
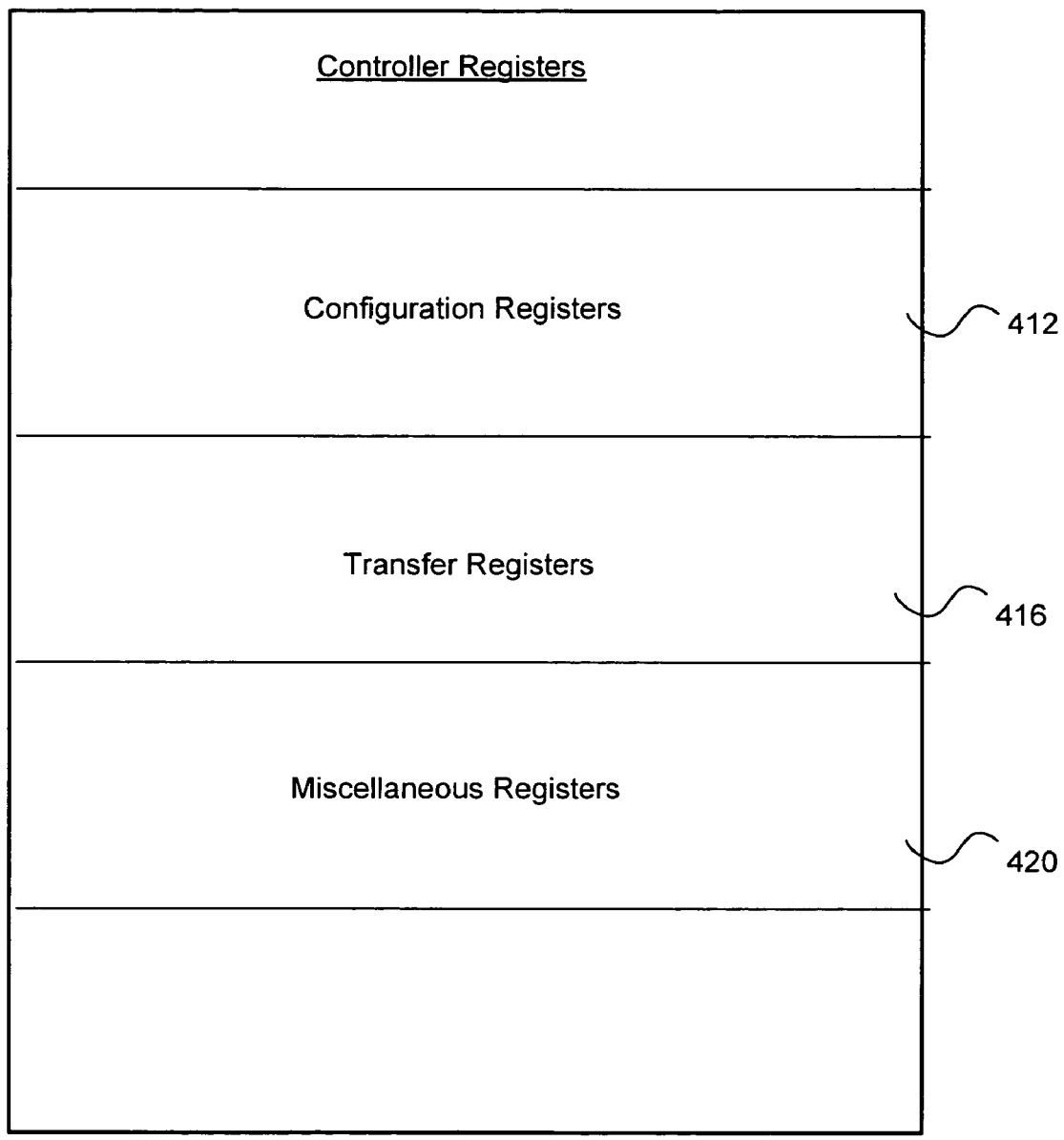
FIG. 4 is a block diagram for one embodiment of the controller registers of FIG. 2, in accordance with the present invention.

Referring now to FIG. 4, a block diagram for one embodiment of the FIG. 2 controller registers 220 is shown, in accordance with the present invention. In the FIG. 4 embodiment, controller registers 220 include, but are not limited to, configuration registers 412, transfer registers 416, and miscellaneous registers 420. In alternate embodiments, controller registers 220 may include elements and functionalities in addition to, or instead of, certain of the elements and functionalities discussed in conjunction with the FIG. 4 embodiment.

In the FIG. 4 embodiment, CPU 122 (FIG. 1) or other appropriate entities may write information into controller registers 220 to specify various types of operational parameters and other relevant information for use by configuration logic 212 of display controller 128. In the FIG. 4 embodiment, controller registers 220 may utilize configuration registers 412 for storing various types of information relating to the configuration of display controller 128 and/or display 134 of electronic device 110. For example, configuration registers 412 may specify a display type, a display size, a display frame rate, and various display timing parameters. In the FIG. 4 embodiment, controller registers 220 may utilize transfer registers 416 for storing various types of information relating to transfer operations for providing pixel data from video memory 216 (FIG. 3) to display 134 of electronic device 110. In the FIG. 4 embodiment, controller registers 220 may utilize miscellaneous registers 420 for effectively storing any desired type of information or data for use by display controller 128. In certain embodiments, controller registers 220 may be implemented to each hold a reduced bit width as compared with the bit width of host bus 138.

Figure 5:
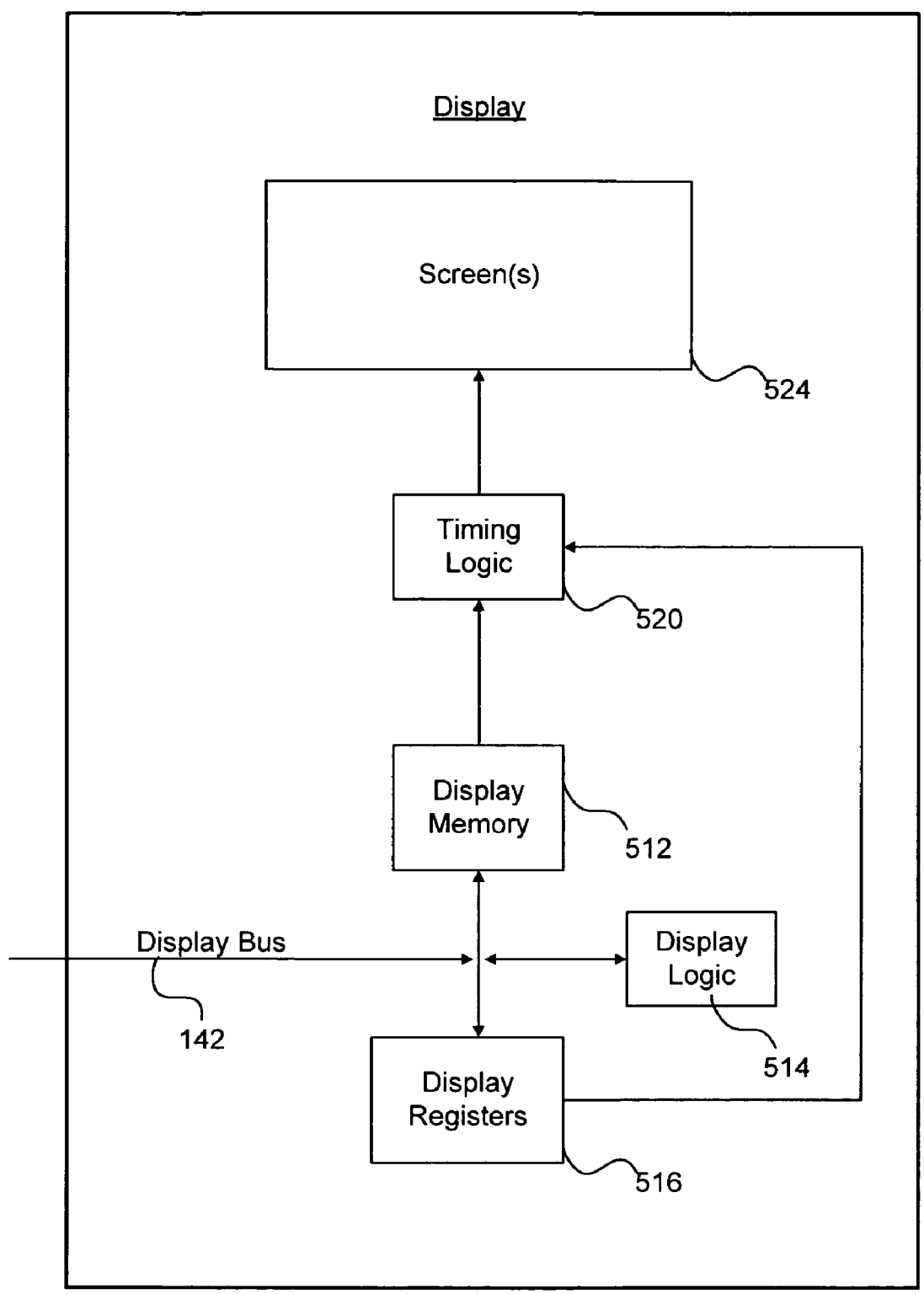
FIG. 5 is a block diagram for one embodiment of the display of FIG. 1, in accordance with the present invention.

Referring now to FIG. 5, a block diagram for one embodiment of the FIG. 1 display 134 is shown, in accordance with the present invention. In the FIG. 5 embodiment, display 134 includes, but is not limited to, a display memory 512, display logic 514, display registers 516, timing logic 520, and one or more screen(s) 524. In alternate embodiments, display 134 may include elements and functionalities in addition to, or instead of, certain of the elements and functionalities discussed in conjunction with the FIG. 5 embodiment.

In the FIG. 5 embodiment, display 134 is implemented as a random-access-memory based liquid-crystal display panel (RAM-based LCD panel). However, in alternate embodiments, display 134 may be implemented by utilizing any type of appropriate display technologies or configurations. In the FIG. 5 embodiment, display controller 128 provides various types of display information to display registers 516 via display bus 142. Display registers 516 may then utilize the received display information for effectively controlling timing logic 520. In the FIG. 5 embodiment, display logic 514 manages and coordinates data transfer and display functions for display 134.

In the FIG. 5 embodiment, display controller 128 provides image data from video memory 216 (FIG. 2) to display memory 512 via display bus 142. In the FIG. 5 embodiment, display memory 512 is typically implemented as random-access memory (RAM). However, in various other embodiments, any effective types or configurations of memory devices may be utilized to implement display memory 512. In the FIG. 5 embodiment, display memory 512 then advantageously provides the image data received from display controller 128 to one or more screens 524 via timing logic 520 for viewing by a device user of electronic device 110.

Figure 6:
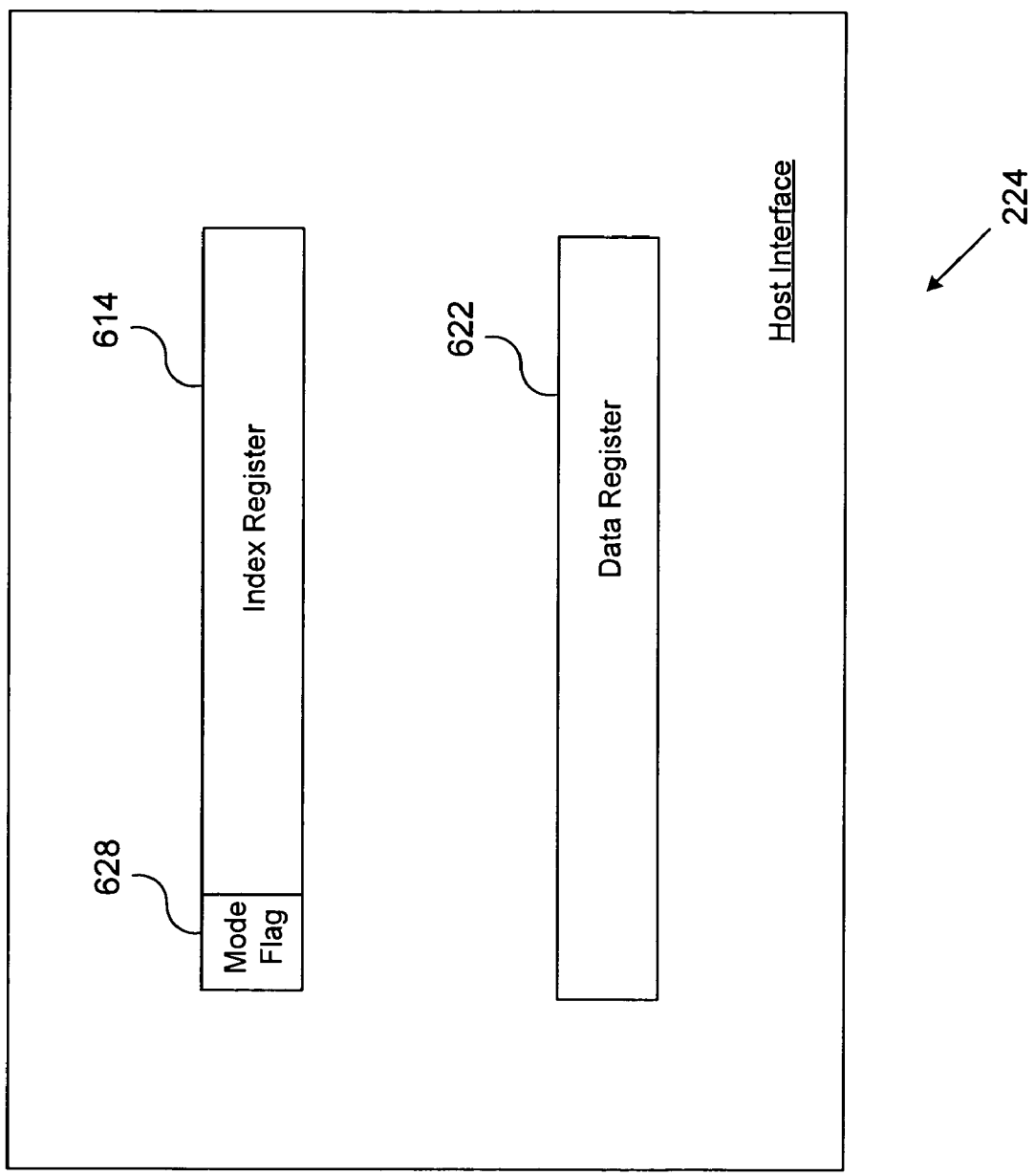
FIG. 6 is a block diagram for one embodiment of the host interface of FIG. 2, in accordance with the present invention.

Referring now to FIG. 6, a block diagram for one embodiment of the FIG. 2 host interface 224 is shown, in accordance with one embodiment of the present invention. In the FIG. 6 embodiment, host interface 224 includes, but is not limited to, an index register 614 and a data register 662. In alternate embodiments, host interface 224 may readily be implemented using components and configurations in addition to, or instead of, certain those components and configurations discussed in conjunction with the FIG. 6 embodiment.

In the FIG. 6 embodiment, CPU 122 (FIG. 1) programs index register 614 either with a read address for a read operation from display controller 128 (FIG. 1), or with a write address for a write operation to display controller 128. In accordance with the present invention, CPU 122 may also program a mode flag 628, as part of either the read address or the write address, to indicate whether a given memory access operation should be performed in a full mode or a partial mode.

In the FIG. 6 embodiment, the full mode accesses a full data width that is equal to the full data transfer size of host interface 224 and host bus 138 (FIG. 1). Alternately, in the FIG. 6 embodiment, the partial mode accesses a partial data width that is less than the full data transfer size of host interface 224 and host bus 138 (FIG. 1). In certain embodiments, the full mode accesses sixteen bits of data, while the partial mode accesses eight bits of data.

In the FIG. 6 embodiment, CPU 122 reads transfer data from data register 622 during a read operation from display controller 128 (FIG. 1). CPU 122 also writes transfer data to data register 622 for a write operation to display controller 128. In certain embodiments, data register 622 is implemented with a data register width that is equal to the full data transfer size of host interface 224 and host bus 138. For example, if the full data transfer size of host interface 224 and host bus 138 is sixteen bits, then data register 622 is implemented with a data register width of sixteen bits. The utilization of host interface 224 and mode flag 628 is further discussed below in conjunction with FIGS. 7-11.

Figure 7:
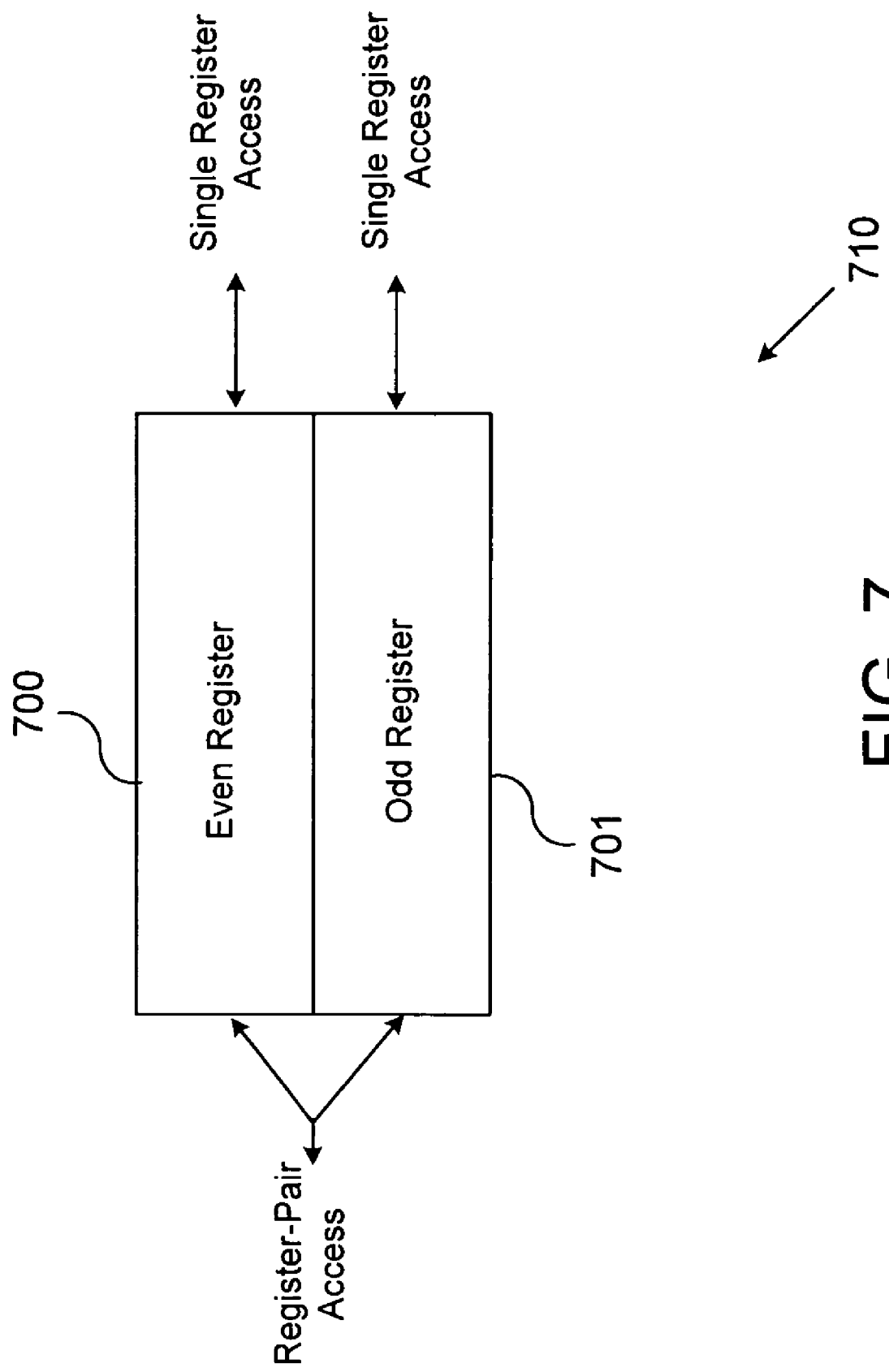
FIG. 7 is a block diagram for one embodiment of an exemplary even-odd register pair, in accordance with the present invention.

Referring now to FIG. 7, a block diagram for one embodiment of an exemplary even-odd register pair 710 is shown, in accordance with one embodiment of the present invention. The FIG. 7 embodiment is presented for purposes of illustration, and in alternate embodiments, the present invention may utilize registers pairs that are implemented using elements and configurations in addition to, or instead of, certain those elements and configurations discussed in conjunction with the FIG. 7 embodiment.

In the FIG. 7 embodiment, even-odd register pair 710 may represent a register pair from controller registers 220 (FIG. 2). Alternately, even-odd register pair 710 may represent any other appropriate registers of electronic device 110. In the FIG. 7 embodiment, even-odd register pair 710 includes an even register 700 that has a corresponding even address. In addition, even-odd register pair 710 also includes an adjacent odd register 701 that has a corresponding odd address. In certain embodiments, even register 700 and odd register 701 are implemented as eight-bit registers.

In the FIG. 7 embodiment, after analyzing mode flag 628 (FIG. 6) to determine an appropriate access mode, memory access module 226 (FIG. 2) of display controller 128 may perform a register-pair access operation in full mode to access data from both even register 700 and odd register 701. Alternately, after analyzing mode flag 628 to determine an appropriate access mode, memory access module 226 may perform a single register access operation in partial mode to access data of either even register 700 or odd register 701.

In conventional memory access systems, when accessing an 8-bit register on a 16-bit indirect interface, a 16-bit value must typically be accessed, effectively accessing the desired register and another un-related register. The software accessing the 8-bit register must then determine whether the desired 8-bit register data is contained within the low-byte or the high-byte of the 16-bit value. Typically, if the register address were even, the 8-bit register data would be contained in the low byte of the 16-bit value. Conversely, if the register address were odd, the 8-bit register data would be contained in the high byte of the 16-bit value. In the latter case, the 8-bit data in the high byte must be shifted down to the low byte to be presentable to the software that requires the 8-bit data.

In conventional memory access systems, writing to an 8-bit register on a 16-bit indirect interface cannot be done in a single write operation. First, the register pair of 8-bit registers that contains the desired target register to write must be read as a single 16-bit value. Then, the software must determine whether the low byte or high byte should be changed to reflect the new 8-bit register data. Finally, the pair of 8-bit registers must be written as a single 16-bit value. Effectively, writing an 8-bit register on a 16-bit interface requires a time-consuming and inefficient three-step read/modify/write operation.

In accordance with certain embodiments of the present invention, the most significant bit of index register 614 (FIG. 6) is designated and programmed as a mode flag 628 to support performing 8-bit accesses to controller registers 220 (FIG. 2) in a partial mode. For example, in certain embodiments with a sixteen-bit index register 614, if bit 15 (mode flag 628) of a programmed memory access address is a binary zero, then memory access module 226 interprets the access operation as a full 16-bit register-pair access. However, if bit 15 of index register 614 is a binary one, then memory access module 226 interprets the access operation as a partial 8-bit single register access. The foregoing partial mode advantageously allows CPU 122 to access 8-bit registers on a 16-bit indirect interface without having to read or overwrite another unrelated 8-bit register.

For example, assume that even-odd register pair 710 is implemented with 8-bit registers. Also assume that at address 0200h, even register 700 contains 11h, and at address 0201h, odd register 701 contains 22h. With conventional memory access systems, to change the contents of even register 700 at address 0200h to 33h, the CPU must read 16-bits of data (2211h) starting at address 0200h. The CPU must next determine that the low byte changes, and change the value to 2233h. The CPU must also write 16-bit data (2233h) at index 0200h, effectively changing even register 700 at address 0200h. In contrast, in accordance with techniques of the present invention, to change even register 700 at address 0200h to contain 33h, CPU 122 must only write 16-bit data (0033h) at index 8200h (with mode flag 628 set to partial mode). Memory access module 226 responsively performs a single register access that changes only even register 700 at address 0200h to contain 33h.

Also in accordance with techniques of the present invention, again assume that at address 0200h, even register 700 contains 11h, and at address 0201h, odd register 701 contains 22h. Memory access module 226 may perform a single register access to read even register 700 at address 0200h by reading transfer address 8200h from index register 614. Memory access module 226 then responsively provides a 16-bit value 0011h from even register 700. Similarly, memory access module 226 may perform a single register access to read odd register 701 at address 0201h by reading register address 8201h from index register 614. Memory access module 226 then responsively provides a 16-bit value 0022h from odd register 701.

In accordance with certain embodiments, by setting mode flag 628 of index register 614 to indicate partial mode, CPU 122 is able to access individual 8-bit registers in single register accesses without having to perform the conventional three-step read/modify/write operation. CPU 122 also need not perform any cumbersome bit-shifting operations when accessing odd registers with corresponding odd addresses.

In the FIG. 7 embodiment, when reading 8-bit registers 700, 701 on a 16-bit indirect host interface 224 (FIG. 1), display controller 128 presets 00h in the high-byte of the 16-bit value (with mode flag 628 of index register 614 indicating partial mode). When writing 8-bit registers 700, 701, display controller 128 ignores any data in the high byte of the 16-bit value (with mode flag 628 of index register 614 indicating partial mode). This allows CPU 122 to read and write 8-bit data in the low-byte of a 16-bit data register 622 without having to perform masking and bit shifting operations.

Figure 8:
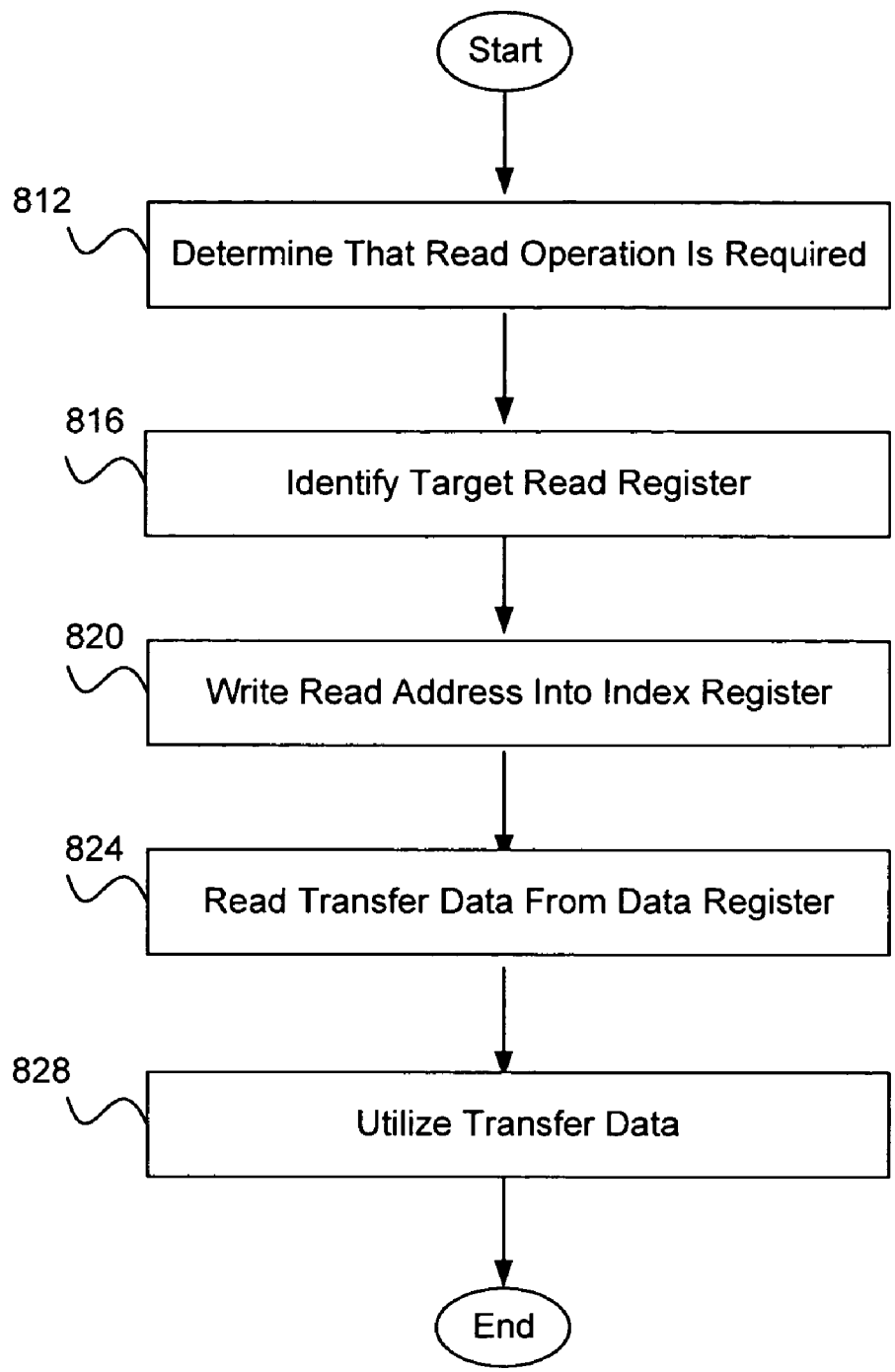
FIG. 8 is a flowchart of method steps for supporting a read operation with the CPU of FIG. 1, in accordance with one embodiment the present invention.

Referring now to FIG. 8, a flowchart of method steps for supporting a read operation with the FIG. 1 CPU 122 is shown, in accordance with one embodiment of the present invention. The FIG. 8 example is presented for purposes of illustration, and in alternate embodiments, the present invention may readily utilize steps and sequences other than certain of those steps and sequences discussed in conjunction with the FIG. 8 embodiment.

In the FIG. 8 embodiment, in step 812, CPU 122 initially determines that a read operation to access transfer data from display controller 128 is required. Then, in step 816, CPU 122 identifies a target read register in controller registers 220 (FIG. 2) by utilizing any appropriate techniques. In step 820, CPU 122 writes a read address corresponding to the identified target read register into an index register 614 in a host interface 224 of display controller 128.

In the FIG. 8 embodiment, the read address incorporates a mode flag 628 that indicates whether display controller 128 should perform the current read operation in a full mode or in a partial mode. Next, in step 824, CPU 122 reads the required transfer data from a data register 622 in the host interface 224 of display controller 128. Finally, in step 828, CPU 122 may utilize the accessed transfer data in any appropriate manner. The FIG. 8 process may then terminate.

Figure 9:
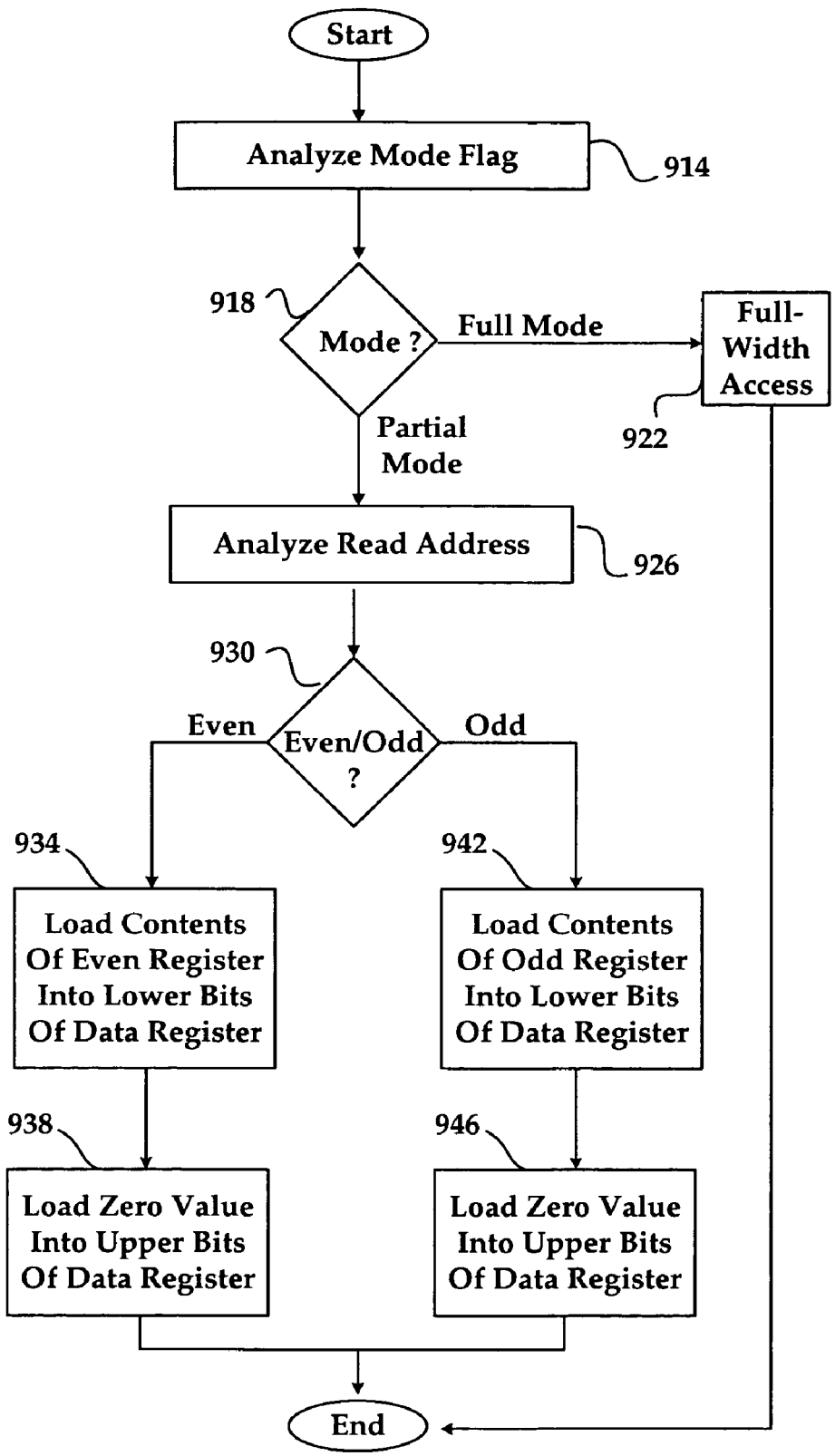
FIG. 9 is a flowchart of method steps for supporting a read operation with the display controller of FIG. 1, in accordance with one embodiment the present invention.

Referring now to FIG. 9, a flowchart of method steps for supporting a read operation with FIG. 1 display controller 128 is shown, in accordance with one embodiment of the present invention. The FIG. 9 example is presented for purposes of illustration, and in alternate embodiments, the present invention may readily utilize steps and sequences other than certain of those steps and sequences discussed in conjunction with the FIG. 9 embodiment.

In the FIG. 9 embodiment, in step 914, a memory access module 226 of display controller 128 initially analyzes a mode flag 628 incorporated into a read address stored in an index register 614 of display controller 128. In step 918, memory access module 226 determines whether to perform a read operation in a full mode or in a partial mode based upon the state of the mode flag 628. If mode flag 628 indicates operating in full mode, then in step 922, memory access module 226 performs a full-width read access to obtain transfer data with a data width that is substantially equal to the data transfer width of a host interface 224 of display controller 128. The FIG. 9 process may then terminate.

However, if mode flag 628 indicates operating in partial mode, then in steps 926 and 930, memory access module 226 analyzes the read address stored in index register 614 to determine whether the read address is an even or odd value. If the read address stored in index register 614 is an even value, then in step 934, memory access module 226 loads the contents of a corresponding even register 700 from controller registers 220 into the lower bits of a data register 622 in display controller 128. In step 938, memory access module 226 also loads a zero value into the upper bits of data register 622. The FIG. 9 process may then terminate.

Alternately, in step 930, if the read address stored in index register 614 is an odd value, then in step 942, memory access module 226 loads the contents of a corresponding odd register 701 from controller registers 220 into the lower bits of data register 622. In step 946, memory access module 226 also loads a zero value into the upper bits of data register 622. The FIG. 9 process may then terminate.

Therefore, in accordance with the present invention, if mode flag 628 indicates operating in partial mode, then memory access module 226 may perform a partial-width read access to provide transfer data with a data width that is less the data transfer width of the host interface 224 of display controller 128.

Figure 10:
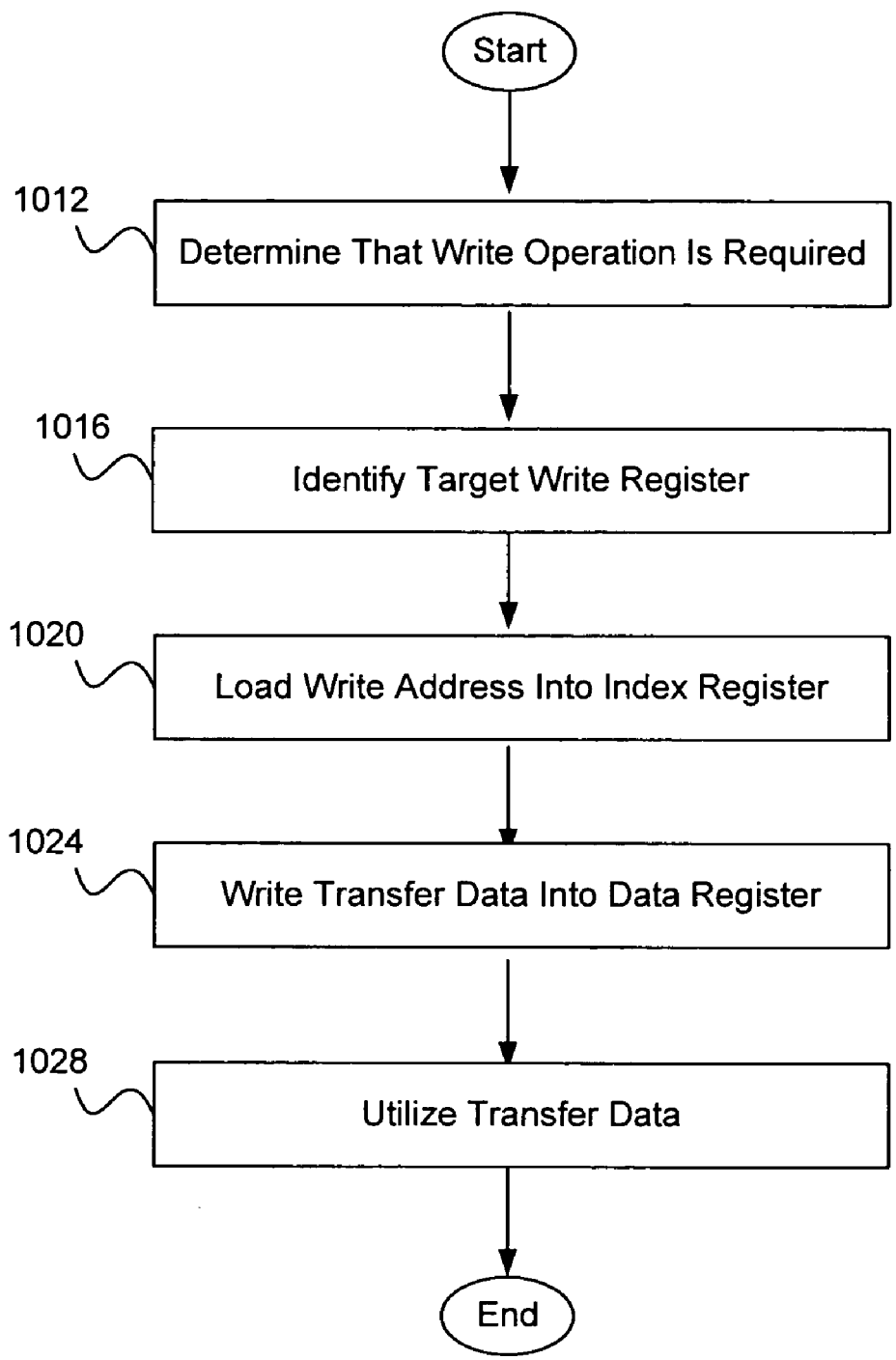
FIG. 10 is a flowchart of method steps for supporting a write operation with the CPU of FIG. 1, in accordance with one embodiment the present invention.

Referring now to FIG. 10, a flowchart of method steps for supporting a write operation with FIG. 1 CPU 122 is shown, in accordance with one embodiment of the present invention. The FIG. 10 example is presented for purposes of illustration, and in alternate embodiments, the present invention may readily utilize steps and sequences other than certain of those steps and sequences discussed in conjunction with the FIG. 10 embodiment.

In the FIG. 10 embodiment, in step 1012, CPU 122 initially determines that a write operation to provide transfer data to display controller 128 is required. Then, in step 1016, CPU 122 identifies a target write register in controller registers 220 (FIG. 2) by utilizing any appropriate techniques. In step 1020, CPU 122 programs a write address corresponding to the identified target write register into an index register 614 in a host interface 224 of display controller 128.

In the FIG. 10 embodiment, the write address incorporates a mode flag 628 that indicates whether display controller 128 should perform the current write operation in a full mode or in a partial mode. Next, in step 1024, CPU 122 writes the required transfer data into a data register 622 in the host interface 224 of display controller 128. Finally, in step 1028, display controller 128 may utilize the transfer data in any appropriate manner. The FIG. 10 process may then terminate.

Figure 11:
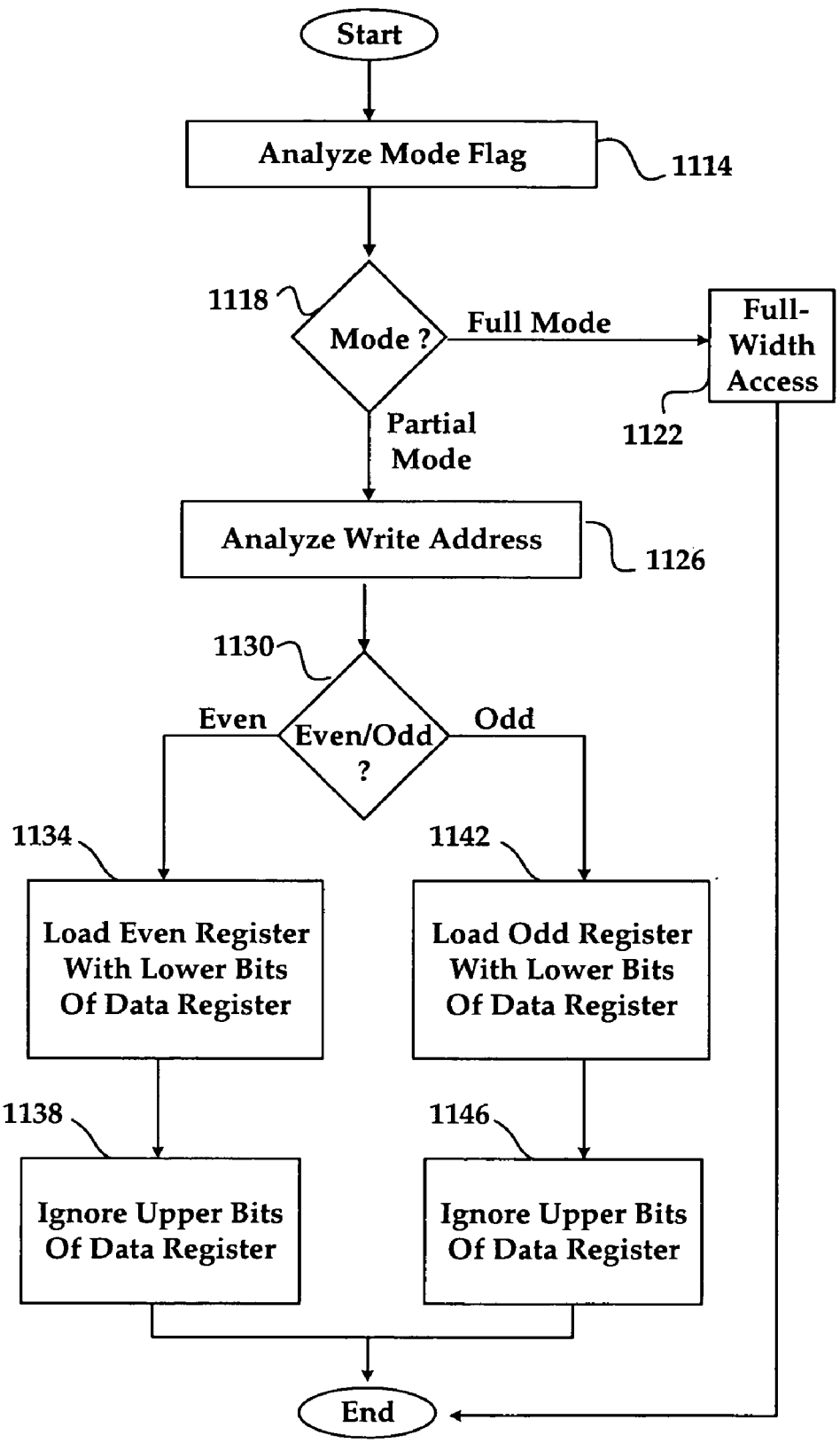
FIG. 11 is a flowchart of method steps for supporting a write operation with the display controller of FIG. 1, in accordance with one embodiment the present invention.

Referring now to FIG. 11, a flowchart of method steps for supporting a write operation with FIG. 1 display controller 128 is shown, in accordance with one embodiment of the present invention. The FIG. 11 example is presented for purposes of illustration, and in alternate embodiments, the present invention may readily utilize steps and sequences other than certain of those steps and sequences discussed in conjunction with the FIG. 11 embodiment.

In the FIG. 11 embodiment, in step 1114, a memory access module 226 of display controller 128 initially analyzes a mode flag 628 incorporated into a write address stored in an index register 614 of display controller 128. In step 1118, memory access module 226 determines whether to perform a write operation in a full mode or in a partial mode based upon the state of the mode flag 628. If mode flag 628 indicates operating in full mode, then in step 922, memory access module 226 performs a full-width write access to provide transfer data with a data width that is substantially equal to the data transfer width of a host interface 224 of display controller 128. The FIG. 11 process may then terminate.

However, if mode flag 628 indicates operating in partial mode, then in steps 1126 and 1130, memory access module 226 analyzes the write address stored in index register 614 to determine whether the write address is an even or odd value. If the write address stored in index register 614 is an even value, then in step 1134, memory access module 226 loads the contents of the lower bits of a data register 622 in display controller 128 into a corresponding even register 700 from controller registers 220. In step 1138, memory access module 226 ignores the contents of the upper bits of data register 622. The FIG. 11 process may then terminate.

Alternately, in step 1130, if the write address stored in index register 614 is an odd value, then in step 1142, memory access module 226 loads the contents of the lower bits of data register 622 into a corresponding odd register 701 from controller registers 220. In step 1146, memory access module 226 ignores the contents of the upper bits of data register 622. The FIG. 11 process may then terminate.

Therefore, in accordance with the present invention, if mode flag 628 indicates operating in partial mode, then memory access module 226 may perform a partial-width write access to provide transfer data with a data width that is less the data transfer width of the host interface 224 of display controller 128. For example, in embodiments in which controller registers 220 are implemented as 8-bit registers, and host interface 224 is a 16-bit indirect interface, the 8-bit controller registers 220 can be read or written directly, without having to perform bit masking and bit shifting operations.

In addition, writing any 8-bit register becomes highly optimized, because no pre-read operation is required. Furthermore, host interface 224 may advantageously be implemented without a separate byte-enable line, thus reducing interface wire count. Memory write/fill operations are optimized, since they do not require time-consuming read/modify/write operations when accessing single bytes. Because writing 8-bit registers does not require the conventional read/modify/write operations, performance when writing 8-bit registers is more than doubled. This performance gain significantly enhances time-critical operations.

In certain situations, registers may contain status bits that are set upon the occurrence of specific events. Writing a binary 1 to the appropriate bit clears the status. Without using the foregoing partial mode, any register containing this type of status bit cannot be accessed using a read/modify/write operation, because if a status bit is a binary 1, writing back a binary 1 to the same bit will clear the status, effectively changing the state of the status bit. Therefore, by utilizing the partial mode discussed above, 8-bit registers may be written individually without creating adverse side-effects on other registers.

The invention has been explained above with reference to certain preferred embodiments. Other embodiments will be apparent to those skilled in the art in light of this disclosure. For example, the present invention may be implemented using certain configurations and techniques other than those described in the embodiments above. Additionally, the present invention may effectively be used in conjunction with systems other than those described above as the preferred embodiments. Therefore, these and other variations upon the foregoing embodiments are intended to be covered by the present invention, which is limited only by the appended claims.

What is claimed is:

1. A system for performing a memory access operation, comprising:
    storage registers configured to store transfer data, said storage registers having a storage register width;
    a host interface that moves said transfer data to and from said storage registers, said host interface having a data transfer width that is greater than said storage register width; and
    a memory access module that analyzes a mode flag that is incorporated into a transfer address, said memory access module performing said memory access operation in a full mode if said mode flag is set to a full access state, said memory access module performing said memory access operation in a partial mode if said mode flag is set to a partial access state, said transfer data having a data width that is equal to said storage register width when said memory access module performs said memory access operation in said partial access mode.

2. The system of claim 1 wherein a host processor programs said mode flag and provides said transfer address to said memory access module to initiate said memory access operation.

3. The system of claim 1 wherein said host interface, said memory access module, and said storage registers are implemented in a display controller integrated-circuit device.

4. The system of claim 1 wherein said display controller integrated-circuit functions as an interface between a host processor and a display device in a portable electronic device.

5. The system of claim 1 wherein said memory access module requires only a single processing cycle to perform said memory access operation.

6. The system of claim 1 wherein said host interface is implemented as a indirect host interface for communicating with said storage registers.

7. The system of claim 1 wherein said host interface has no separate byte-enable line to select between said full mode and said partial mode.

8. The system of claim 1 wherein said host interface includes an index register for storing said transfer address and said mode flag.

9. The system of claim 1 wherein said host interface includes a data register for temporarily storing said transfer data.

10. The system of claim 1 wherein said memory access module accesses said transfer data only from an adjacent even-odd pair of said storage registers during said full mode.

11. The system of claim 1 wherein said memory access module selectively accesses said transfer data from any single one of said storage registers during said partial mode.

12. The system of claim 1 wherein said storage registers are implemented as 8-bit registers with said storage register width being eight binary bits wide, said host interface being implemented as a 16-bit indirect interface with said data transfer width being sixteen binary bits wide.

13. The system of claim 1 wherein said mode flag is implemented as the most-significant bit of said transfer address.

14. The system of claim 1 wherein said memory access operation is a read operation in said partial mode, said memory access module analyzing said transfer address to determine whether said transfer address is an even value or an odd value, said memory access module determining that said transfer address is an even value, said memory access module then loading contents of a corresponding even addressed one of said storage registers into lower bits of a data transfer register, said memory access module also loading a zero value into upper bits of said data transfer register.

15. The system of claim 1 wherein said memory access operation is a read operation in said partial mode, said memory access module analyzing said transfer address to determine whether said transfer address is an even value or an odd value, said memory access module determining that said transfer address is an odd value, said memory access module then loading contents of a corresponding odd addressed one of said storage registers into lower bits of a data transfer register, said memory access module also loading a zero value into upper bits of said data transfer register.

16. The system of claim 1 wherein said memory access operation is a write operation in said partial mode, said memory access module analyzing said transfer address to determine whether said transfer address is an even value or an odd value, said memory access module determining that said transfer address is an odd value, said memory access module then loading a corresponding odd addressed one of said storage registers with lower bits from a data transfer register, said memory access module also ignoring upper bits of said data transfer register.

17. The system of claim 1 wherein said memory access operation is a write operation in said partial mode, said memory access module analyzing said transfer address to determine whether said transfer address is an even value or an odd value, said memory access module determining that said transfer address is an even value, said memory access module then loading a corresponding even addressed one of said storage registers with lower bits from a data transfer register, said memory access module also ignoring upper bits of said data transfer register.

18. The system of claim 14 wherein said memory access module performs a direct access of a single odd-addressed one of said storage registers during said partial mode.

19. A method for performing a memory access operation, comprising:
    providing storage registers to store transfer data, said storage registers having a storage register width;

moving said transfer data to and from said storage registers through a host interface that has a transfer width which is greater than said storage register width; and utilizing a memory access module to analyze a mode flag that is incorporated into a transfer address, said memory access module performing said memory access operation in a full mode if said mode flag is set to a full access state, said memory access module performing said memory access operation in a partial access mode if said mode flag is set to a partial access state, said transfer data having a data width that is equal to said storage register width when said memory access module performs said memory access operation in said partial access mode.

* * * * *